Feb. 13, 1968   G. J. HEUER, JR., ETAL   3,368,624
CONTROL OF GAS-OIL RATIO IN PRODUCING WELLS
Filed Oct. 1, 1965

INVENTORS
GEORGE J. HEUER, JR.
MARTIN FELSENTHAL
CLAUDE L. JACOCKS

*Gerald L. Floyd*
ATTORNEY

United States Patent Office 3,368,624
Patented Feb. 13, 1968

3,368,624
CONTROL OF GAS-OIL RATIO IN PRODUCING WELLS
George J. Heuer, Jr., Martin Felsenthal, and Claude L. Jacocks, Ponca City, Okla., assignors to Continental Oil Company, Ponca City, Okla., a corporation of Delaware
Filed Oct. 1, 1965, Ser. No. 492,064
7 Claims. (Cl. 166—29)

ABSTRACT OF THE DISCLOSURE

A method of decreasing the ratio of gas and/or water produced along with oil in a well by injecting therein a foaming agent and, optionally, an aqueous medium to form a foam plug in situ in the path of the gas or water.

Summary

A method of decreasing the gas-oil ratio and/or water-oil ratio in an oil well comprising:

(a) injecting into the well a foaming agent either alone or in aqueous solution,
(b) optionally, precede or follow, or both precede and follow, the foaming agent with a slug of aqueous medium, and
(c) producing the well to create a foam barrier in the path of formation gas or water.

This invention relates to the control of the ratio of various fluids produced from wells. More particularly, the invention relates to a method of decreasing the gas-oil ratio and/or water-oil ratio in hydrocarbon-producing wells.

Many liquid hydrocarbon producing wells also produce water, gas, or both. It is often desirable to produce the maximum amount of liquid hydrocarbons or oil while maintaining the production of water and gas at a minimum. Excessive gas production frequently results in a penalty being imposed upon a well by regulatory agencies. Excessive water production means increased cost of lifting, separating and disposal of the water as well as possible increase in corrosion of borehole equipment.

Although reservoirs differ widely, a common type is composed of a substantially horizontal layer of oil underlaid by a layer of water and overlaid by a layer of gas. Any one, any two, or all three phases may be present. When a well is put on production, the formation fluids move through the strata toward the wellbore due to a pressure differential. If the well is completed in the oil zone, this pressure differential will cause water to move upwardly and gas to move downwardly toward the wellbore as well as oil to move laterally. This results in water and/or gas coning and production of these fluids as well as oil.

Various solutions have been proposed to the problem of water or gas coning. Low production rates involve low pressure differentials and often result in relatively high oil production compared to flow of either water or gas. However, such rates are often uneconomical. Wells can be completed at a point in the oil zone as far away from a known water or gas zone as possible. This method is not applicable to thin pay zones and is otherwise unsatisfactory due to the large vertical distances over which a water or gas cone can move. Another method is to set a mechanical plug in the borehole at a level above the oil-water interface and set a packer below the gas-oil interface. Oil is then flowed into the well above the plug or below the packer. However, coning water and gas soon bypass the plug or packer. Various liquid plugging materials, such as resin, gel or cement solutions, have been forced into the formation in the hope that they will predominantly enter either the gas or water zone and set to form a plug. The main difficulty with such plugging methods is proper placement. Either the plugging material fails to create a complete barrier to the encroaching extraneous water or gas or else the solution inadvertently enters at least a portion of the oil zone and also interrupts the flow of oil. Therefore, there remains a need for a method to satisfactorily control gas-oil and water-oil ratios.

Accordingly, it is an object of this invention to control the ratio of various fluids produced from wells. It is a further object to decrease the gas-oil and/or water-oil ratio of hydrocarbon-producing wells. It is a still further object to provide a method for suppressing water coning or gas coning into well boreholes. It is another object to suppress such water coning or gas coning without appreciably reducing the effective producing area of the oil-producing formation. It is still another object to provide a method of forming a plugging agent in a well formation.

The above and related objects may be realized by a process wherein a foaming agent is injected into the subterranean formation surrounding a wellbore and the well placed on production. Preferably, the foaming agent is injected in such a manner so that it primarily enters the formation near the interface of the water and oil producing zones or the interface of the gas and oil producing zones or both. Still more preferably, the foaming agent is injected directly into the water zone or gas zone. While the foaming agent alone may be used, it is usually more economical to utilize an aqueous solution of the foaming agent. It is further preferred to either precede or follow, or both precede and follow, the foaming agent with a slug of aqueous medium. In cases where gas coning is involved, no further operations are required other than placing the well on production. In cases where water coning is involved, it is necessary to follow the injection of the foaming agent with injection of a slug of gas. Preferably, the gas slug is utilized following the slug of aqueous medium injected following the foaming agent if such an aqueous medium is employed. As above, the well is next placed in or returned to production. In the resulting movement of fluids in the reservoir, the foaming agent contacts and mixes with gas moving toward the well form a gas-in-water dispersion or foam. The foam has a high resistance to flow and forms a barrier which restricts further movement of gas or water toward the wellbore.

The method of this invention may be better understood by reference to FIGURES 1 through 6, which illustrate, schematically through vertical sections of a well, one embodiment of the present invention at separate stages of the operation.

FIGURE 1 shows well 2 as originally completed for production from oil stratum 4 through perforations 6 via tubing 8 isolated by packer 10 near the lower end thereof. Oil stratum 4 is underlaid by water stratum 12 and overlaid by gas stratum 14.

FIGURE 2 shows conditions existing in well 2 after production has been carried on for some time. Vertical movement of well fluids which occurs along with the horizontal movement thereof has caused coning of both water from water stratum 12 and gas from gas stratum 14, resulting in the production of both water and gas along with oil.

FIGURE 3 illustrates conditions existing in the well at the start of treatment to suppress production of encroaching water. Tubing 8 and packer 10 have been lowered until the bottom of tubing 8 is approximately level with the top of water stratum 12. Additional perforations 16 have been made in water stratum 12. A slug of foaming agent solution 18 has been pumped down tubing 8, through perforations 16 and out into water stratum 12.

Figure 1:
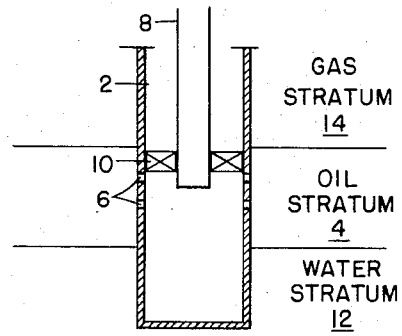
Figure 2:
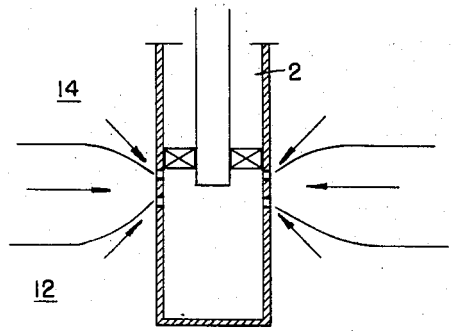
Figure 3:
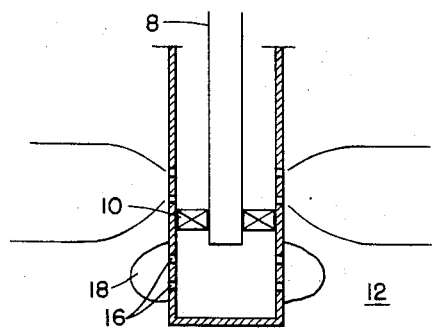
Figure 4:
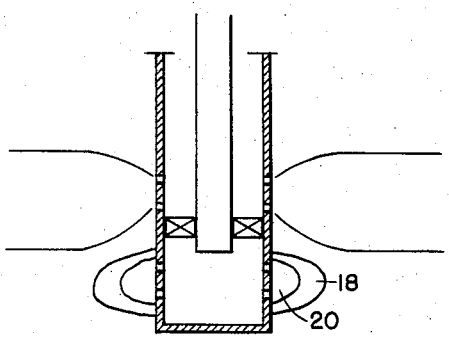
FIGURE 4 shows a slug of brine spacer fluid 20 being pumped into the formation following foaming agent solution 18.
Figure 5:
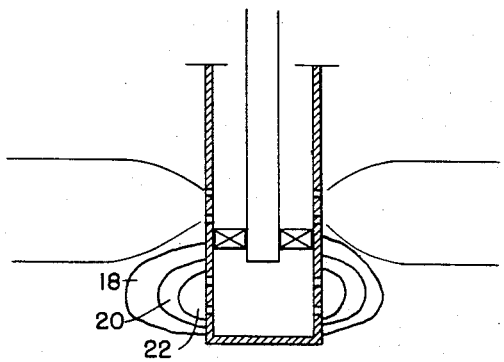
FIGURE 5 shows a slug of air or other gas 22 being pumped into the formation next.
Figure 6:
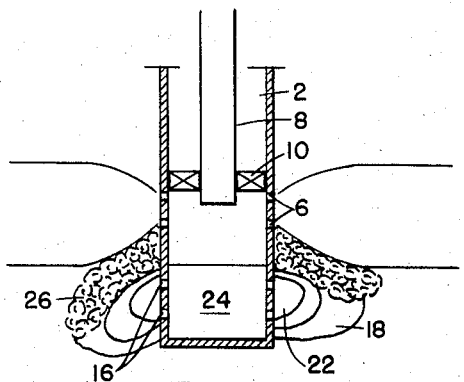

FIGURE 6 shows conditions in well 2 wherein tubing 8 and packer 10 have been raised to their original positions and lower perforations 16 have been plugged off by cement plug 24. When the well is returned to production through original perforations 6, movement of water will cause foaming agent 18 to contact air slug 22 to create a zone of foam 26 which serves as a barrier and reduces further movement of water toward perforations 6. It is preferred to create a substantial pressure differential between the formation and the wellbore when the well is first returned to production to promote an initial movement of gas and foaming agent in the formation of at least about three feet in order to form a more substantial foam. After the foam has formed, this pressure differential is then decreased to that existing prior to treatment so as not to put undue pressure on the foam and cause it to be produced.

Essentially the same procedure is repeated to similarly plug off the gas zone with foam. In this instance (not illustrated) the order of fluid slugs injected into the gas zone is brine spacer fluid, followed by foaming agent solution, followed by brine tail in. No gas slug is required, as when the well is returned to production, the gas in the formation moves in to contact the foaming agent solution and creates the zone of foam which blocks further movement of gas toward the perforations. In plugging off a gas zone, the foaming agent may be injected into the formation through the existing perforations. This results in most of the foaming agent entering the relatively permeable gas zone and a minor amount entering the oil zone. Alternatively, additional perforations may be made up hole and the foaming agent injected therethrough completely into the gas zone.

Any foaming agent may be used which will create a foam when formation brine or injected water containing such foaming agent contacts and mixes with formation or injected gas under reservoir conditions. Illustrative of suitable foaming agents are various water-soluble surface-active agents, such as:

A. *Nonionic*

(I) Products obtained by autocondensation of various fatty matter and their derivatives with ethylene oxide, propylene oxide, glycols, or glycerols:

(a) a fatty acid plus ethylene oxide or glycerol, such as palmitic acid plus 5 moles ethylene oxide or glycerol monostearate;
(b) an alcohol plus ethylene oxide, such as hydroabietyl alcohol plus 15 moles ethylene oxide;
(c) an ester or aldehyde plus ethylene oxide;
(d) an amide or amine plus ethylene oxide, such as diethanolamine plus 15 moles ethylene oxide.

(II) Products obtained by condensation of phenolic compounds having lateral chains with ethylene or propylene oxide. Examples are disecbutyl phenol plus 10 moles ethylene oxide and octyl phenol plus 12 moles ethylene oxide.

B. *Cationic*

(I) Neutralization product of primary, secondary or tertiary amine with an acid such as trimethyl octyl ammonium chloride, lauryl dimethyl benzyl ammonium chloride and the like, commonly referred to as quaternary ammonium chlorides.

C. *Anionic*

(I) Alkyl aryl sulfonates such as ammonium isopropyl benzene sulfonate;

(II) Fatty alcohol sulfates such as sodium 2-methyl-7-ethyl-4-hendecyl sulfate;
(III) Sulfated and sulfonated amides and amines such as sodium N-methyl-N-oleyl taurate;
(IV) Sulfated and sulfonated esters and ethers such as dioctyl sodium sulfo succinate;
(V) Alkyl sulfonates such as sodium dodecyl sulfonate.

D. *Ampholytic*

(I) Molecules where the molecule as a whole forms a zwitterion, such as cetylaminoacetic acid.

A reference book which describes many types of surfactants suitable as foaming agents is "Surface Active Agents and Detergents," volumes I and II, by Schwartz et al., Interscience Publishers.

Especially suitable foaming agents are compounds of the formula

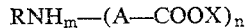
$$RNH_m—(A—COOX)_n$$

in which R is an aliphatic hydrocarbon group having 8 to 22 carbon atoms, A is a divalent hydrocarbon radical having 1 to 6 carbon atoms, X is a member selected from the group consisting of hydrogen, alkali metal and amine, $n$ is an integer of 1 to 2, $m$ is an integer of 0 to 1, and the sum of $m$ and $n$ is 2.

Another excellent foaming agent is composed of 50 percent by weight ammonium salt of sulfated ethoxylated n-decanol containing about 40 percent ethylene oxide based on the alcohol, 15 percent isopropanol and 35 percent water, as described in copending U.S. Ser. No. 313,789 and having the same assignee as the instant invention, hereinafter referred to as Foaming Agent A. Still another preferred foaming agent is the condensation product of octyl phenol with 10 moles ethylene oxide.

As stated previously, the foaming agent may be injected into the formation alone, with the water constituent of the foam coming from connate water or other water present in the formation. However, it is generally preferred to employ an aqueous solution of the foaming agent which is of lower viscosity and hence easier to inject than the concentrated foaming agent. Also, such a solution is more economical to use and gives adequate foaming. The concentration of the foaming agent in water may be as low as about 0.5 percent by weight. Generally, more than about 5.0 percent foaming agent is of little advantage, although more concentrated solutions are not harmful. Fresh water may be used, but it is generally preferred to use a brine, such as brine previously removed from the formation being treated or a synthetic brine, in order to decrease formation damage.

The size of the various slugs of fluid used in this invention vary widely, depending on the reservoir characteristics and relative size of the various fluid-containing zones. In general, the brine preflush keeps the foaming agent solution from contacting gas near the wellbore and thus insures that the zone of foam will be created at a substantial distance from the wellbore where the pressure gradient is relatively small and the foam will have less tendency to move. A volume of from 1,000 to 4,000 gallons preflush is usually sufficient. The brine tail in also helps displace the foaming agent solution back into the formation away from the immediate wellbore area. A volume of from 5,000 to 20,000 gallons tail in generally is satisfactory. The volume of foaming agent solution required depends on the concentration of foaming agent in the solution, adsorption characteristics and porosity of the formation. Generally enough foam agent solution should be injected so that the unabsorbed solution will extend about ten to twenty feet from the wellbore into the formation being treated.

The gas used in connection with plugging off water zones may be any available gas such as air, nitrogen, carbon dioxide, natural gas, exhaust gases from internal combustion engines, flue gases and the like.

EXAMPLE 1

A Berea sandstone core, 2 inches in diameter and 12 inches long, having a permeability to air of 245 millidarcys, a porosity of 19.5 percent and a pore volume of 124.4 cc., was saturated with brine containing 50,000 p.p.m. sodium chloride and 15 p.p.m. mercuric chloride. The core was saturated with oil by injecting therein 1,250 cc. No. 80 pale oil. The core then contained 96 cc. oil, and oil could be flowed through the core at a rate of 0.10 cc./sec. at a pressure differential of 300 p.s.i. 38 cc. foaming agent solution containing 1.9 cc. Foaming Agent A was injected into the core, resulting in the production of 38 cc. oil and no brine. Oil backflowed through the core at a pressure of 300 p.s.i. resulted in 91 percent of the initial oil flow rate being established after one hour. This shows that the foaming agent solution entering the oil zone had only slight effect in decreasing subsequent oil production. This is the expected result since there was no gas phase in the core to create a foam.

EXAMPLE 2

A 2-inch diameter, six-foot long Berea sandstone core of similar properties to that described above was treated to resemble a gas zone by sequentially saturating the core with brine, containing 50,000 p.p.m. sodium chloride and 15 p.p.m. mercuric chloride. The core was flooded with 3,000 cc. of kerosine. It was then gas-driven with nitrogen at a 100 p.s.i.g. inlet pressure and zero p.s.i.g. outlet pressure for 24 hours. At this stage the core was in a condition similar to that of a gas sand. A 50 cc. brine "spearhead" was injected from the producing end at a 100 p.s.i.g. inlet pressure. This was followed by 303 cc. of brine containing 5 percent by volume of Foaming Agent A. During placement of the foaming agent solution 63 cc. of brine and 2 cc. of oil were produced from the core.

The core was returned to normal gas flow by injecting nitrogen into the inlet at 100 p.s.i.g., with the outlet being at zero p.s.i.g. A foam block was set up in the core. The foam block was 98 percent effective for 15 days and 95 percent effective for 28 days. Pressure gradients indicated that the foam agent solution backflowed approximately three linear feet before the foam set up. This test showed that the foaming agent solution entering a gas-containing zone will sharply decrease subsequent gas flow. Thus, Examples 1 and 2 taken together show that a foaming agent solution can partially plug a gas zone but not an oil zone.

Well example

A well compeleted in the Pennsylvanian formation in the Northeast Cherokee Field in Oklahoma had a depth of 5209 feet, perforations from 5180 to 5200 feet and 37 to 40 feet net effective pay zone of oil and gas, with the gas-oil contact between 5159 and 5167 feet. When the well was initially completed, it flowed 154 barrels oil per day through a 20/64-inch choke with a gas-oil ratio of 1,886:1. Production of oil decreased and gas-oil ratio increased until the well was shut in five years after the start of production, at which time the well was making 33 barrels oil per day through a 8/64-inch choke, with a gas-oil ratio of 6,322:1. When the well was reopened after a 17-month shutdown, production was 19 barrels oil per day through a 8/64-inch choke with a gas-oil ratio of 10,695:1. It was desired to treat this well to decrease the flow of gas which was coning down to the perforations without appreciably affecting oil production. Accordingly, the well was treated by injecting into the formation at the rate averaging 10 barrels per hour 75 barrels of brine from the Pennsylvanian formation. This spearhead of brine insured that the well would take fluid and move the gas back into the formation. Next, 332.5 barrels brine, containing 17.5 barrels Foaming Agent A, was injected at the rate of about 40 barrels per hour. Finally, 350 barrels brine tail in was injected at the rate of about 40 barrels per hour to move the foaming agent solution out into the formation and away from the immediate wellbore area. Following this treatment, 254 barrels of brine were swabbed from the well, after which the well started to flow naturally. Oil began flowing at an appreciable rate 24 hours later and soon reached a rate of 30 barrels oil per day. Oil continued to flow at a rate of 25 to 30 barrels oil per day for four days. During this period, gas flow was initially very light, about 1 percent of the rate before treatment. The gas production rate increased steadily until after 4 days. Gas suddenly came in strongly and a 28/64-inch choke was applied. Thus the foam, created by the injected foaming agent solution mixing with the formation gas when production of the well was resumed after the treatment, sharply reduced gas production for a substantial length of time.

It is apparent that many modifications and variations of the invention hereinbefore set forth may be made without departing from the spirit and scope thereof. The examples given are by way of illustration only, and the invention is limited only by the terms of the appended claims.

What is claimed is:

1. The method of controlling the ratio of fluids produced from a well comprising sequentially injecting into the subterranean formation surrounding the well an aqueous medium, a foaming agent and an aqueous medium, subsequently placing the well into production at a substantial pressure differential to create a foam and then decreasing the pressure differential to that existing prior to treatment.

2. The method of claim 1 wherein the foaming agent is added as a solution in an aqueous medium.

3. The method of claim 2 wherein the aqueous medium is a brine.

4. The method of controlling the gas/oil ratio in a well comprising sequentially injecting into the producing formation of said well an aqueous preflush, an aqueous solution of a foaming agent and an aqueous tail in, and then placing the well in production.

5. The method of claim 4 wherein the treating fluids are injected directly into the gas zone of the well.

6. A method of controlling the gas/oil ratio in a well comprising sequentially injecting into the gas zone of said well a foaming agent and an aqueous tail in, and then placing the well on production.

7. A method of controlling the gas/oil ratio in a well comprising sequentially injecting into the gas zone of said well an aqueous preflush, a foaming agent, and an aqueous tail in, and then placing the well on production.

References Cited

UNITED STATES PATENTS

| 2,053,285 | 9/1936 | Grebe | 166—42 |
| 3,141,503 | 7/1964 | Stein | 166—29 |
| 3,207,218 | 9/1965 | Holbrook et al. | 166—32 |

OTHER REFERENCES (1) Brown, W. E.: "Surfactant Treatment Selectively Seals Off Water Entry" in The Petroleum Engineer, November 1957, pp. B-72, B-80, B-82, B-84, B-86.

(2) Bernard, G. G. & Holm, L. W.: "Effect of Foam on Permeability of Porous Media to Gas." Society of Petroleum Engineers Journal, September 1964, pp. 267-274.

JAMES A. LEPPINK, *Primary Examiner.*